(No Model.) 2 Sheets—Sheet 1.

A. SENEFF.
SEPARATOR.

No. 568,705. Patented Sept. 29, 1896.

WITNESSES:
H. Walker

INVENTOR
A. Seneff
BY
Munn & Co.
ATTORNEYS.

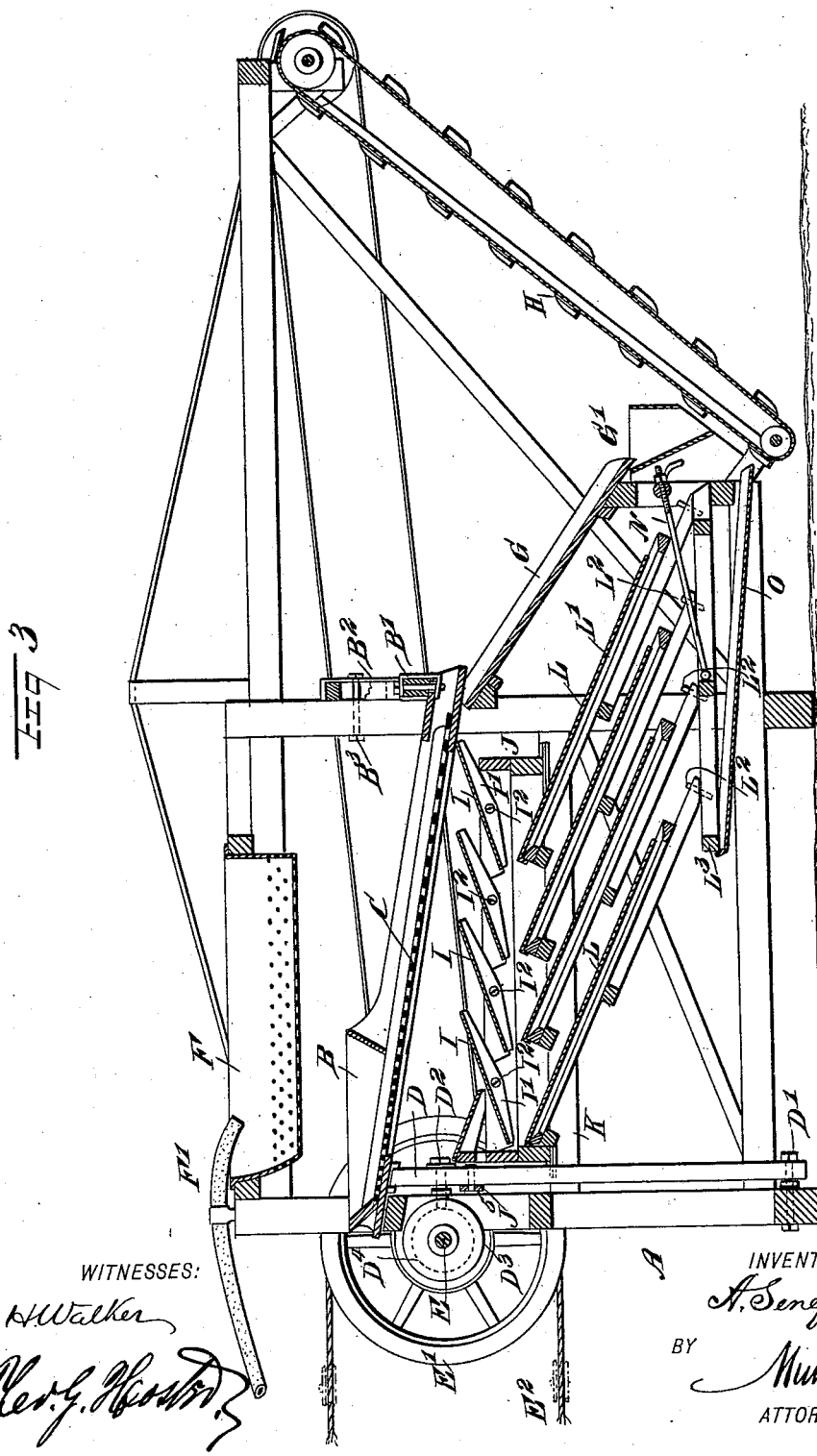

United States Patent Office.

ALBERT SENEFF, OF LARAMIE, WYOMING, ASSIGNOR TO HIMSELF AND GEORGE TIMMERMAN, OF SAME PLACE.

SEPARATOR.

SPECIFICATION forming part of Letters Patent No. 568,705, dated September 29, 1896.

Application filed September 9, 1895. Serial No. 561,908. (No model.)

*To all whom it may concern:*

Be it known that I, ALBERT SENEFF, of Laramie, in the county of Albany and State of Wyoming, have invented a new and Improved Separator, of which the following is a full, clear, and exact description.

The object of the invention is to provide a new and improved separator which is simple and durable in construction, very effective in operation, and more especially designed for use in placer-mining for separating the fine gold from the sand and tailings, and also for treating pulverized material from quartz-mills and other machines for the same purpose.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
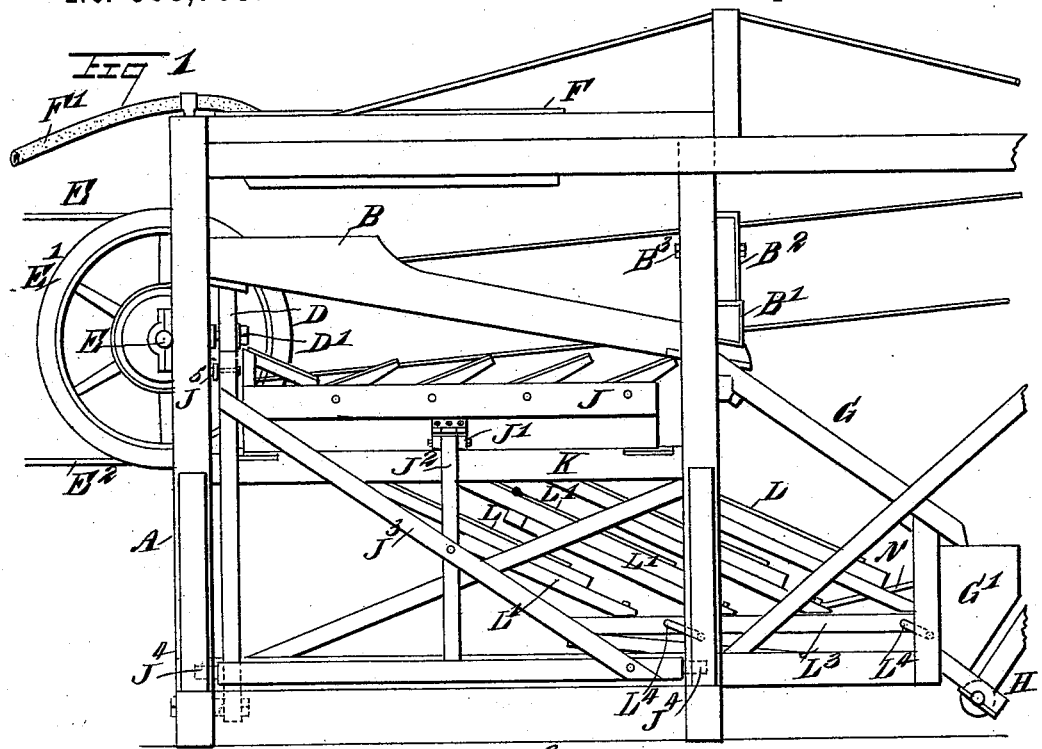
Figure 2:
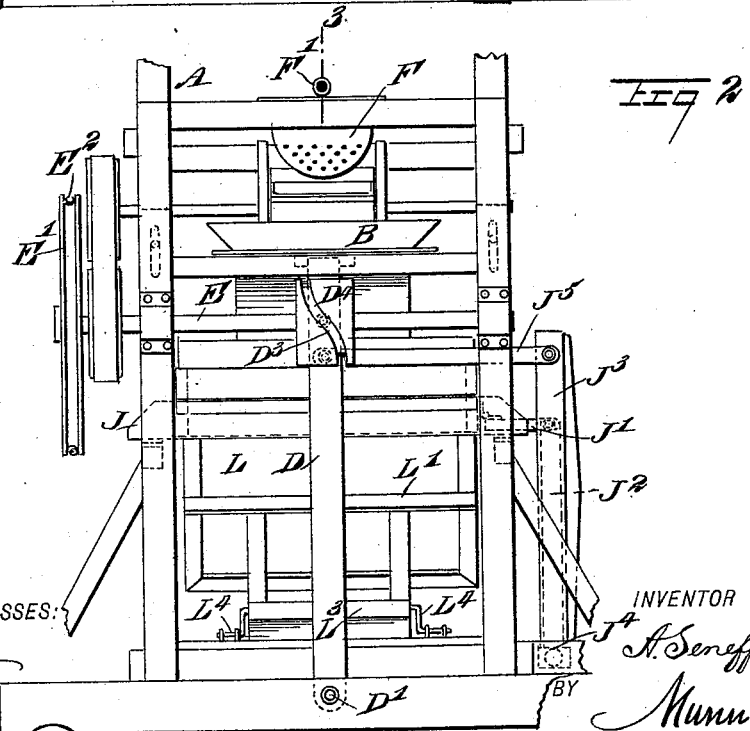

Figure 1 is a side elevation of the improvement. Fig. 2 is an end view of the same, and Fig. 3 is a sectional side elevation of the same on the line 3 3 of Fig. 2.

The improved separator is provided with a frame A, in which is arranged a hopper B, adapted to receive the material to be treated and containing in its bottom an inclined graduated sieve C, extending a suitable distance below the hopper B, as is plainly illustrated in Fig. 3. The hopper B, with the sieve C, is adapted to receive a shaking motion, and for this purpose the lower end of the hopper is hung on pivots B', supported on bars B², held vertically adjustable on the main frame A and adapted to be secured thereto by bolts B³.

The upper end of the hopper B is pivotally connected at its under side with a rocking arm D, fulcrumed at its lower end at D' on the main frame A and provided near its upper end with a pin or friction-roller D², engaging a cam-groove D³ in a cam D⁴, secured on the main driving-shaft E, journaled on the front end of the frame A and provided with a pulley E', connected by belt or rope E² with suitable machinery for imparting a continuous rotary motion to the said shaft E. As the latter is rotated the cam D⁴ causes a transverse swinging of the rock-arm D, so that a like transverse swinging motion is given to the hopper B to agitate the material therein and cause it to sift through the sieve C, the operation being aided by water passing in showers upon the material both in the hopper B and the lower part of the sieve C from a perforated tank F, connected with a suitable source of water supply by a pipe F'.

The coarser material, such as gravel, passes down the inclined sieve C to drop from the latter onto a chute G and then pass to a hopper G', both secured on the main frame, as is plainly shown in Figs. 1 and 3. The hopper G' discharges at its lower end into the box of an elevator H of any approved construction and driven from the main shaft E, so as to deliver the tailings a suitable distance away from the machine, it being understood that the sand after the final separation from the gold likewise passes to the said elevator, as hereinafter more fully described.

The gold and sand passing through the sieve C, after being separated from the gravel, fall upon aprons I, made of duck or canvas and stretched on arms I', pivotally secured at their middle by screws I² to the sides of a frame J, mounted to slide transversely on the top of a frame K, supported on the main frame A. The aprons I are held in an inclined position, as plainly shown in Figs. 1 and 3, and the inclination can be increased or diminished by the operator loosening the screws I² and then setting the arms I to the desired angle and again fastening the screws, so as to hold the arms and aprons in place.

A transverse shaking is given to the apron-frame J from the rocking arm D, and for this purpose the frame J is pivotally connected by a transversely-extending link J' with the vertical arm J² of a skeleton frame J³, having its lower bar provided with trunnions J⁴, engaging bearings in one side of the frame A. The skeleton frame J³ is connected by a link J⁵ with the rock-arm D, so that the rocking motion of the latter is transmitted by the link J⁵ to the frame J³, so that the link J' imparts a transverse sliding or shaking motion to the apron-frame J. Owing to this connection the sieve C and the aprons I will receive a reciprocating motion in the same direction, but the upper sieve C will have a more rapid motion than the aprons. Thus the material passing upon the aprons I is subjected to the rocking motion, and consequently the latter is agitated to cause a separation of the gold from the sand, part of the gold adhering to the meshes of the fabric of which the aprons are made. The larger portion of the gold and sand, however, passes down the aprons to discharge upon a second set of aprons L, made of heavy bristles, carpet, or like material, each apron being secured to a frame L', having its upper end secured to the inside of the frame J and its lower end pivotally connected by dowel-pins $L^2$ with a frame $L^3$, hung on links $L^4$, and adapted to be raised and lowered by a screw-rod N to change the angle of the aprons L. The latter terminate at their lower ends a suitable distance from the lower cross-bar of the frame L', so that the tailings drop from the aprons into a chute O, supported in the frame A below the frame $L^3$, the said chute O discharging at its lower end into the box of the elevator H to carry off the tailings, together with the gravel passing to the elevator by the hopper G'.

The operation is as follows: The material discharged into the hopper B is subjected to the action of the water from the shower-tank F to readily separate the gold-bearing sand from the gravel, the latter passing down the lower end of the sieve C to the elevator H, as previously explained. The gold-bearing sand passing through the sieve C falls into the inclined aprons I, which retain some of the precious metals and discharge the rest upon the aprons L, made of a fabric that will readily retain in its meshes all the gold that is contained in the gold-bearing sand washed down the aprons L. The latter are arranged in an opposite direction to the aprons I, so that the course of the material is completely changed, and consequently the gold is readily taken up by the meshes and saved, while the sand and other tailings pass into the chute O and down the same to the elevator H to be carried to one side of the machine.

Having thus fully described my invention, I claim as new and desire to secure by Letters Patent—

1. An apparatus for separating gold from sand and other foreign matter, provided with a frame, and a series of juxtaposed, partly-overlapping inclined aprons constructed to retain the precious metal, the upper ends of said aprons being arranged in approximately the same level and the aprons being pivotally connected to the frame at their centers to permit of adjusting their inclination, substantially as described.

2. An apparatus for separating gold from sand and other foreign matter, provided with a feed-sieve, a frame located below said feed-sieve, and a series of juxtaposed gold-retaining aprons secured to the frame, and each receiving material directly from the feed-sieve, said aprons being pivotally connected to the frame at their centers to permit of adjusting their inclination, substantially as described.

3. A separator provided with a shaking frame carrying a series of juxtaposed inclined aprons, and a second set of stationary oppositely-inclined aprons each having its upper end arranged in operative relation to one of the shaking aprons, substantially as described.

ALBERT SENEFF.

Witnesses:
SAMUEL A. CRAWFORD,
ARTHUR EASTMAN.